United States Patent [19]

Fawzy

[11] 3,845,338

[45] Oct. 29, 1974

[54] DIRECT CURRENT SHELL ARMATURE MOTOR

[75] Inventor: Moharram M. Fawzy, North Wales, Pa.

[73] Assignee: Transicoil, Inc., Worcester, Pa.

[22] Filed: Feb. 20, 1974

[21] Appl. No.: 444,073

[52] U.S. Cl. .............................. 310/154, 310/266
[51] Int. Cl. ............................................ H02k 21/28
[58] Field of Search .......... 310/266, 154, 267, 268, 310/178, 46, 112, 114

[56] References Cited
UNITED STATES PATENTS

| | | | |
|---|---|---|---|
| 3,001,093 | 9/1961 | Wilcox et al. | 310/266 X |
| 3,237,036 | 2/1966 | König | 310/266 |
| 3,335,309 | 8/1967 | Hausen | 310/266 |
| 3,426,224 | 2/1969 | Esters | 310/46 |
| 3,440,464 | 4/1969 | Tolmie | 310/154 |
| 3,462,626 | 8/1969 | Kluss | 310/266 X |
| 3,555,330 | 1/1971 | Svecharnik | 310/266 |
| 3,602,749 | 8/1971 | Esters | 310/154 |

FOREIGN PATENTS OR APPLICATIONS

| | | | |
|---|---|---|---|
| 1,039,127 | 9/1958 | Germany | 310/266 |

Primary Examiner—D. F. Duggan
Attorney, Agent, or Firm—Seidel, Gonda & Goldhammer

[57] ABSTRACT

An efficient direct current motor using a shell armature with toroidally wound coils thereon. The armature coils interact with two independent magnetic circuits. One magnetic circuit includes an inner magnet enclosed by the armature shell and radially magnetized. An inner magnetic core is disposed within the inner magnet and in direct contact therewith to form a return path. The second circuit includes an outer magnet radially magnetized oppositely to said radially magnetized inner magnet and enclosing said shell armature. An outer magnetic yoke is disposed outside and in direct contact with the outer magnet to form a return path therefor. The shell armature is disposed between the inner and outer magnet and adapted to rotate in response to interaction between the fields created by the two magnetic circuits and current in the armature windings.

5 Claims, 5 Drawing Figures

PATENTED OCT 29 1974          3,845,338
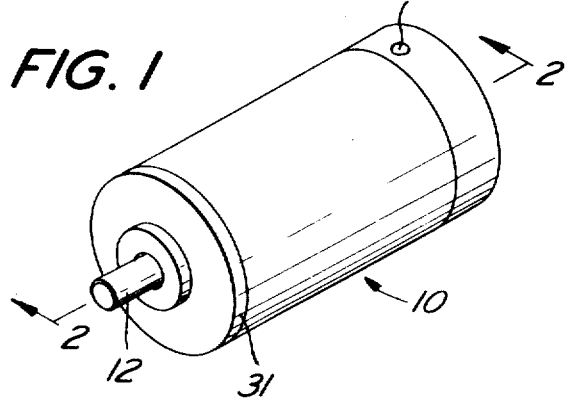
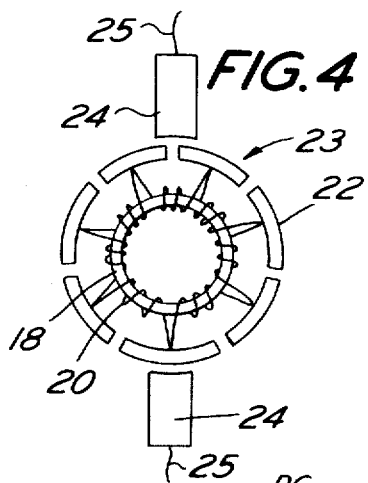
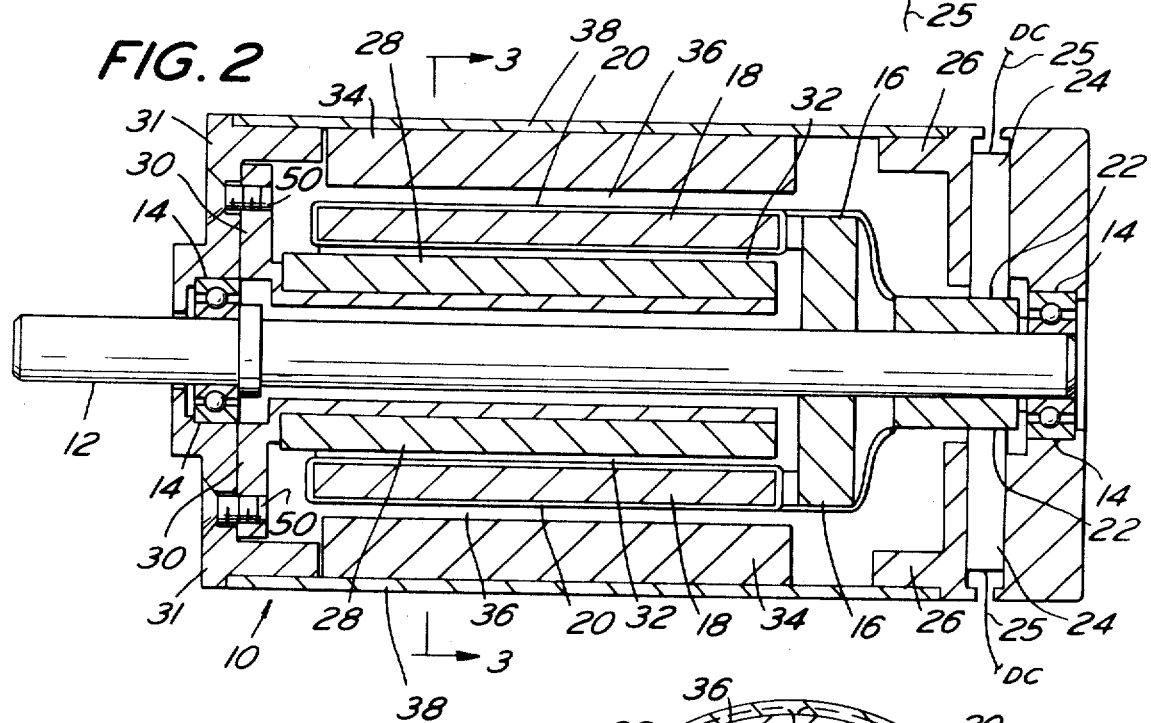
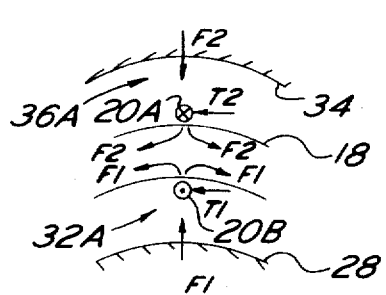
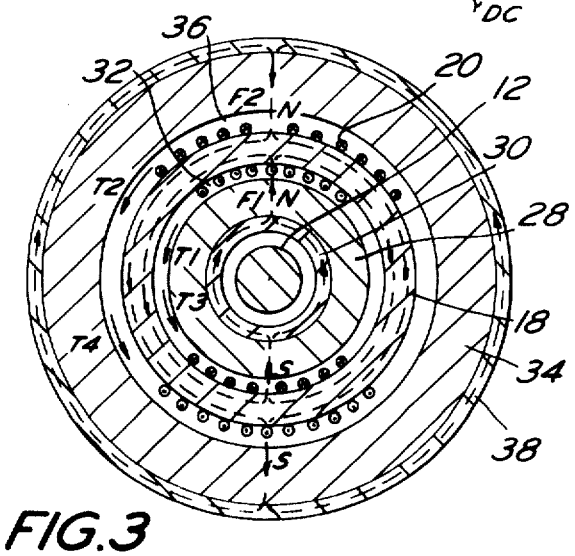

DIRECT CURRENT SHELL ARMATURE MOTOR

BACKGROUND OF THE INVENTION

The present invention relates to a direct current shell armature motor having a low inertia and fast response. More particularly, the present invention relates to a direct current motor comprising a shell-type rotor disposed intermediately between inner and outer permanent magnet stators which form two independent magnetic circuits.

In general, shell-type rotors are known in the prior art. However, the shell-type rotor is ordinarily used in conjunction with an outer permanent magnet stator co-axial with and enclosing the rotor and an inner permeable magnetic material co-axial with and enclosed by the rotor which material provides a flux return path. Alternatively, the rotor may be used in conjunction with an inner permanent magnet stator co-axial with and enclosed by the rotor and an outer permeable magnetic material co-axial with and enclosing the rotor, which material provides a flux return path. In either arrangement, both the magnetic material furnishing the flux return path and the inner or outer permanent magnet stator are co-axial with the shell-type rotor. The rotor is disposed intermediately between the permeable material and the permanent magnet. This arrangement creates a single magnetic circuit and a single magnetic field which operates with a field generated by current flow in the rotor. Other limitations of these prior art configurations include a delayed torque response of the motor. Another significant limitation is the inability to generate high torques without resorting to intricate motor constructions. In general, the response of the motor will depend upon the size of the air gap between the permanent magnet stator and a flux return path, the inertia of the shell-type rotor, and the interaction between the particular stator magnetic field and the magnetic field created by current flow through the armature or rotor coils.

In order to improve the torque response of a direct current motor, prior art efforts have focused primarily on the construction of the shell-type rotor. Various rotor constructions have been proposed. However, little attention has been paid to the effect of various magnetic circuits upon the operation of the motor. Basically, the prior art provides a single permanent magnet stator cooperating with a single flux return path member to provide the magnetic circuit. The shell-type rotor, of whatever structure chosen, merely intercepts the single magnetic field established by the particular magnetic circuit.

For example, U.S. Pat. No. 3,418,505—Mihalko et al. attacks the problem of improving the torque response of the direct current motor by providing a particular shell-type rotor. By mounting the rotor coils in a particular fashion, rotor inertia is decreased. No changes are introduced in the conventional magnetic circuit in which the magnetic field passes completely through the shell rotor of the direct current motor. The shell-type rotor disclosed by Mihalko et al. does not contain a permeable magnetic material and does not coact with two independent magnetic circuits.

As described in U.S. Pat. No. 3,308,319— Faulhaber et al., the magnetic circuit conventional to the prior art may be established by positioning a permanent magnet stator inside and coaxially with a permeable magnetic flux return path member. In this configuration, the shell-type rotor is disposed intermediately between the stator and the flux return path member. In this configuration, only a single magnetic circuit is provided and the rotor does not contain any permeable magnetic material.

Inner and outer permanent magnet stators have been proposed with a rotor positioned intermediately between the stators. This configuration has been proposed for use in both motors and generators. For example, in U.S. Pat. No. 3,396,296—Esters, a rotor is disposed intermediately between inner and outer permanent magnet stators. The rotor contains a plurality of electromagnets. Each electromagnet has a central metal core aligned radially with the inner and outer permanent magnet stator pole faces. The poles of the outer permanent magnet stator are oriented to face oppositely magnetized poles on the inner permanent magnet stator. The electromagnet of the rotor completes a single magnetic circuit which includes an inner and outer stator permanent magnet. The Esters disclosure does not relate to a direct current motor of the shell armature type which uses a shell armature comprised of a magnetically permeable material to form part of two independent magnetic circuits.

Additionally, it is known in the prior art to use inner and outer permanent magnet stators wherein adjacent poles of the inner and outer stators are of opposite polarity. More specifically, U.S. Pat. No. 3,532,916—Fisher describes a synchronous motor or generator having a non-magnetic shell-type rotor and inner and outer permanent magnet stators. The inner and outer permanent magnet stator pole faces are oriented such that poles of opposite magnetization face each other in order to produce a single strong unidirectional magnetic field in the gap. The rotor comprises a nonmagnetic material such as fiberglass. The Fisher disclosure is directed to an alternating current machine which does not use a magnetically permeable shell rotor in which the windings on the inner and outer sides of the shell rotor coact with a separate magnetic field supplied by a separate magnetic circuit.

It has also been known in the proir art to use inner and outer permanent magnet stators in a dynamoelectric machines which are magnetized in an axial direction. Such a disclosure is provided by U.S. Pat. No. 3,426,224—Esters. However, this Esters patent does not disclose the use of an inner and outer permanent magnet stator which are oppositely magnetized in the radial direction. Furthermore, this reference does not teach the concept of a magnetically permeable shell armature which forms part of two independent magnetic circuits. Furthermore, the Esters patent does not teach nor make obvious the concept of providing two independent magnetic circuits which create two independent magnetic fields. One of these magnetic fields coacts with the portion of the toroidal windings on the outer portion of the shell armature and the other magnetic field coacts with the portion of the toroidal coil windings on the inner portion of the shell armature.

BRIEF SUMMARY OF THE INVENTION

A principal advantage of the present invention is the providing of two independent magnetic circuits which generate two independent magnetic fields which coact with the magnetic field generated by current flow through a toroidal winding on a shell armature. More particularly, one of the magnetic fields coacts with the magnetic field created by current flow through the portion of the toroidal winding on the outer side of the shell armature, and the second independent magnetic field coacts with the magnetic field created by current flow through the portion of the toroidal coil on the inner side of the shell armature. The force or torques created by interaction with the first and second fields are additive in nature due to the inner and outer stator permanent magnets being oppositely magnetized.

Another principal advantage of the present invention is that it provides a direct current motor of the shell variety shich has a low rotor inertia and which generates relatively high torques using a simple motor construction.

Another advantage of the present invention is that it provides a shell-type rotor which is permeable and of minimal crosssection and which cooperates in a novel and non-obvious manner with co-axial permanent magnets and associated flux return paths to generate maximal torques.

In addition, an advantage of the present invention is that it provides a direct current motor of the shell variety having an optimal time response to the electrical input.

Moreover, it is an object of the present invention to provide a direct current motor of the shell variety having the above characteristics and, in addition, perfectly continuous inner and outer permanent magnet stator surfaces.

Briefly, the present invention overcomes the deficiencies in the prior art which have been enumerated above. In sharp contrast to the prior art, a shell armature (also known as a shell rotor) is wound toroidally with coils or conductors which receive the direct current input to the motor. Significantly, the shell comprises a permeable material which furnishes flux return paths for two independent magnetic circuits. Equally important, co-axial inner and outer permanent magnet stators are radially magnetized in opposing directions, resulting in novel and non-obvious cooperation of the rotor shell with the permanent magnets. The shell armature is disposed intermediately between the inner and outer permanent magnet stators. Each magnetic circuit creates a magnetic field in the gap between the stator and the shell armature. One magnetic field coacts with the field of the toroidal windings on the outer side of the shell armature and the second magnetic field coacts with the field of the toroidal windings on the inner side of the shell armature to create additive forces or torques on the shell armature. As a result, a plurality of independent magnetic circuits couple the armature shell with both the inner and outer stators. The interaction of the permanent magnet fields with the magnetic field produced by the coils of the armature or rotor will result in reinforcing component torques. In this manner, appreciably greater resultant torques will be generated for a given rotor inertia.

Although the present invention is described in terms of a direct current motor for the sake of a concrete example, it is understood that the invention relates to a dynamoelectric machine and may be used to convert mechanical energy into eletrical or vice versa as is conventional in the art.

BRIEF DESCRIPTION OF THE DRAWINGS

For the purpose of illustrating the invention, it is shown in the drawings a form which is presently preferred; it being understood, however, that this invention is not limited to the precise arrangements and instrumentalities shown.

FIG. 1 is a view in perspective of a direct current motor constructed in accordance with the principles of the present invention.

FIG. 2 is a cross-sectional view taken along lines 2—2 of FIG. 1 of a direct current motor constructed in accordance with the principles of the present invention.

FIG. 3 is a cross-sectional view taken along line 3—3 of FIG. 2 of a direct current motor constructed in accordance with the principles of the present invention.

FIG. 4 is a schematic representation of the armature coil windings and commutator inter-connections.

FIG. 5 is an exploded view of a portion of FIG. 3 showing a single turn of the toroidal coil winding.

DETAILED DESCRIPTION OF THE INVENTION

Referring now to the drawings in detail, where like numerals indicate like elements, there is shown in FIG. 2 a cross-sectional view of a direct current motor 10 constructed in accordance with the principles of the present invention. The motor 10 includes a rotatable shaft 12. The shaft 12 is maintained in a fixed axial position by bearings 14 or other suitable rotation means which allow the shaft to rotate in a conventional manner. Support means 16 securely mount armature shell 18 to shaft 12. Shaft 12 and armature shell 18 will rotate as a single unit. Armature shell 18 is constructed of a magnetically permeable material and may be laminated or drawn. Coils or conductors 20 are wound toroidally about armature or rotor shell 18. Coils 20 terminate in electrical contact with commutator segments 22 of commutator 23. Commutator segments 22 are in direct electrical contact with brushes 24 according to principles well-known in the art. Brushes 24 are connected in the conventional manner to a direct current source by leads 25. Rear cover 26 serves as a support for brushes 24 and for commutator segments 22 as well as for bearings 14. Preferably, cover 26 is comprised of insulating material. The interconnections of coils 20 with commutator segments 22 and brushes 24 are shown more clearly schematically in FIG. 4. As shaft 12 and armature shell 18 rotate, commutator segments 22 sequentially contact stationary brushes 24 as is well-known in the art.

Inner magnet 28 is disposed within and is co-axial with shell 18. Inner magnet 28 comprises a permanent magnetic material and is magnetized radially. Magnetic inner core 30 comprises a permeable magnetic material. As shown in FIGS. 2 and 3, inner core 30 is disposed co-axially and in immediate contact with inner magnet 28. Core 30 is securely fastened to front cover 31 by suitable fastening means 50. In this manner, core 30 serves as a support for inner magnet 28 and as a magnetic flux return path.

Outer magnet 34 is disposed outside and co-axial with rotor shell 18. Air gap 36 separates outer magnet 34 from shell 18. Outer magnet 34 is radially magnetized oppositely from radially magnetized inner magnet 28, as shown in FIG. 3. That is, adjacent surfaces on magnets 34 and 28 are of the same magnetic polarity. More particularly, the inner surface of outer magnet 34 and the outer surface of inner magnet 28 which face each other (with rotor shell 18 removed) are like magnetic poles or of the same magnetic polarity at each point around the stator structure. Magnetic outer yoke 38 is disposed outside outer magnet 34 and coaxially therewith. Outer magnet 34 and outer yoke 38 are in direct contact. Yoke 38 is comprised of a magnetically permeable material and functions as a return path for outer magnet 34. Yoke 38 is held in place by insulating cover 26 and front cover 31 as shown in FIG. 2. Outer magnet 34 is fixed to yoke 38.

Referring now to FIGS. 3 and 5 in detail, it will be seen that the present invention provides two independent magnetic circuits, each of which provides a force on the armature shell coil windings 20 and a resulting torque on the armature which is additive. The first magnetic circuit is comprised of inner magnet 28, armature shell 18 and inner core 30. This magnetic circuit is shown in dotted lines in FIG. 3. Referring to FIGS. 3 and 5 together, the magnetic circuit forms a path starting at the north pole of inner magnet 28, through air gap 32 at location 32a. This first magnetic circuit path continues through armature shell 18, again crosses air gap 32 into the south pole of inner magnet 28 and returns to the north pole of inner magnet 28 via inner core 30.

The second magnetic circuit is comprised of outer magnet 34, armature shell 18 and yoke 38. The second magnetic circuit traces a path starting at the north pole of outer magnet 34 as shown in FIG. 3. The second magnetic circuit path continues across air gap 36 into armature shell 18. The magnetic circuit or magnetic flux path leaves the armature shell 18, again crosses air gap 36 on the bottom of FIG. 3 and enters the south pole of outer magnet 34 as shown on the bottom of FIG. 3. The circuit or magnetic flux path is completed via yoke 38 as shown in FIG. 3.

Referring to FIG. 5 in detail, there is shown an exploded view of the upper portion of armature shell 18 showing only a single winding of toroidal coils 20 having a portion of the winding 20A on the outer surface of armature shell 18 and portion 20B on the inner surface of armature shell 18. The portion of the winding or wire 20A is shown having current flow into the page and the portion of the winding or wire 20B is shown as having current flow coming out of the page. Using the right-hand motor rule for current flow, the interaction of the magnetic field caused by current flow through wire 20B with the magnetic flux or magnetic field F1 causes a force or torque T1 on the armature 18 in the direction of arrow T1. The magnetic flux or magnetic field F1 is generated in air gap 32 at location 32A as shown in FIG. 5 by the first magnetic circuit. The interaction between the magnetic field caused by current flow in wire 20A with the magnetic flux or magnetic field F2 produces a force or torque T2 in the direction as shown by the arrow T2. The magnetic flux or magnetic field F2 is created in air gap 36 at location 36A by the second magnetic circuit. It is therefore seen that by the use of two magnetic circuits, both sides of the toroidal winding are active in producing a turning force or torque on the armature which is additive. Therefore, practically 100 percent of the coil windings 20 are torque-producing thereby increasing the torque to mass ratio. It may further be noted that if only a single magnetic circuit or field were used in the gap between outer magnet 34 and inner magnet 28, the torques created on wires 20A and 20B would be subtractive in nature or tending to cancel each other.

In a similar manner, torques T3 and T4, as indicated by the arrows in FIG. 3, are produced at the diametrically opposite portion of armature shell 18. It may be seen that the torques, T1, T2, T3 and T4 are additive and therefore result in large torques per unit mass of the armature and per unit of inertia of the armature. By the use of the two magnetic circuits, the windings 20 which are preferably made of copper, are twice as efficient since both the portions of the windings on the outer and inner surfaces of armature shell 18 are utilized.

Although the stators of the specific embodiment have been disclosed with a single pole pair, it is understood that additional pole pairs may be utilized on each stator with appropriate modifications of the windings and commutator structure as is well known in the art. The use of a multiplicity of pole pairs on each of the stators would result in an even further reduction in the amount of iron required in the rotor and therefore reduce the inertia of the rotor or armature.

Furthermore, since structure of the present invention does not require slots, the effects of magnetic cogging is practically eliminated.

In summary, the present invention provides a direct current dynamoelectric machine of the shell-type armature with inner and outer co-axial radially magnetized permanent magnets which provides a much greater torque for a given armature inertia due to the use of two independent circuits. One of the magnetic circuits creates a torque on the portion of the toroidal windings on the inner surface of the shell-type armature and the second magnetic circuit creates a torque on the portion of the toroidal coil windings on the outer portion of the shell-type armature. The present invention may be used to convert electrical energy into mechanical energy or to convert electrical energy into electrical energy. Therefore, the present invention has many applications in the field of direct current dynamoelectric machines. A few of the typical applications of the present invention are fast response servomotors, capstan tape drives and low ripple tachometers.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for direct current dynamoelectric use, comprising: a rotatable shaft; a permeable magnetic armature shell co-axial with and secured to said shaft, said armature shell being provided with coils toroidally wound thereon; an inner magnet radially magnetized disposed co-axial with said shaft between said shaft and said armature shell; a magnetic inner core comprising permeable magnetic material disposed to function as a magnetic return path for said inner magnet; said inner magnet, armature shell and inner core comprising a first magnetic circuit; an outer magnet disposed outside and co-axial with said armature shell, said outer magnet being radially magnetized oppositely to said radially magnetized inner magnet; a magnetic yoke comprising permeable magnetic material disposed to function as a magnetic return path for said outer magnet; said outer magnet, armature shell and yoke comprising a second magnetic circuit; and, commutator means, said commutator means being adapted to supply to or receive from said armature shell coils a direct current.

2. Apparatus in accordance with claim 1 wherein said magnetic inner core is disposed intermediately between said shaft and said inner magnet and in direct contact with said inner magnet.

3. Apparatus in accordance with claim 1 wherein said magnetic yoke is disposed outside and co-axial with said outer magnet and in direct contact with said outer magnet.

4. Apparatus in accordance with claim 1 wherein said armature shell is laminated.

5. Apparatus in accordance with claim 1 wherein said armature shell is drawn.

* * * * *